United States Patent [19]
Reiter et al.

[11] Patent Number: 5,996,227
[45] Date of Patent: *Dec. 7, 1999

[54] VALVE NEEDLE FOR AN ELECTROMAGNETICALLY ACTUATED VALVE AND PROCESS FOR MANUFACTURING THE SAME

[75] Inventors: Ferdinand Reiter, Markgröningen; Werner Sefz, Oberaurach; Ludwig Dorsch, Bamberg, all of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/619,474

[22] PCT Filed: Jun. 27, 1995

[86] PCT No.: PCT/DE95/00825

§ 371 Date: Jun. 17, 1996

§ 102(e) Date: Jun. 17, 1996

[87] PCT Pub. No.: WO96/03579

PCT Pub. Date: Feb. 8, 1996

[30] Foreign Application Priority Data

Jul. 22, 1994 [DE] Germany .............................. 44 26 006

[51] Int. Cl.$^6$ ................................................. F02M 61/00
[52] U.S. Cl. .................................... 29/888.45; 239/585.4; 239/900
[58] Field of Search ............................ 239/585.1, 585.4, 239/900; 29/888.45, 888.452

[56] References Cited

U.S. PATENT DOCUMENTS

| | | | |
|---|---|---|---|
| 1,984,751 | 12/1934 | McBride et al. | 239/888.452 |
| 2,452,636 | 11/1948 | Cunningham et al. | 29/888.452 |
| 4,477,027 | 10/1984 | Knapp et al. | 239/900 X |
| 4,564,145 | 1/1986 | Takada et al. | 239/533.3 X |
| 4,625,919 | 12/1986 | Soma et al. | 239/900 X |
| 4,946,107 | 8/1990 | Hunt | 239/585.4 |
| 5,040,731 | 8/1991 | Yokoyama et al. | 239/900 X |
| 5,170,987 | 12/1992 | Krauss et al. | 239/585.4 X |
| 5,178,362 | 1/1993 | Vogt et al. | |

FOREIGN PATENT DOCUMENTS

| | | |
|---|---|---|
| 40 08 675 | 9/1991 | Germany . |
| 42 30 376 | 4/1993 | Germany . |

*Primary Examiner*—Kevin Weldon
*Attorney, Agent, or Firm*—Kenyon & Kenyon

[57] ABSTRACT

The new valve needle comprises at least one valve-needle section and a valve-closure member section of the valve needle which are manufactured as one part by means of deep-drawing. To guarantee a flowing of the fuel in the direction of the valve seat, two beads are provided, for example, in the valve-needle section, while truncations are formed on the valve-closure member section having a hemispherical bowl shape. Thus, the fuel flows along on the outer periphery of the valve-needle section. The valve needle is especially suited for injection valves in fuel-injection systems of mixture-compressing internal combustion engines with externally supplied ignition.

20 Claims, 2 Drawing Sheets

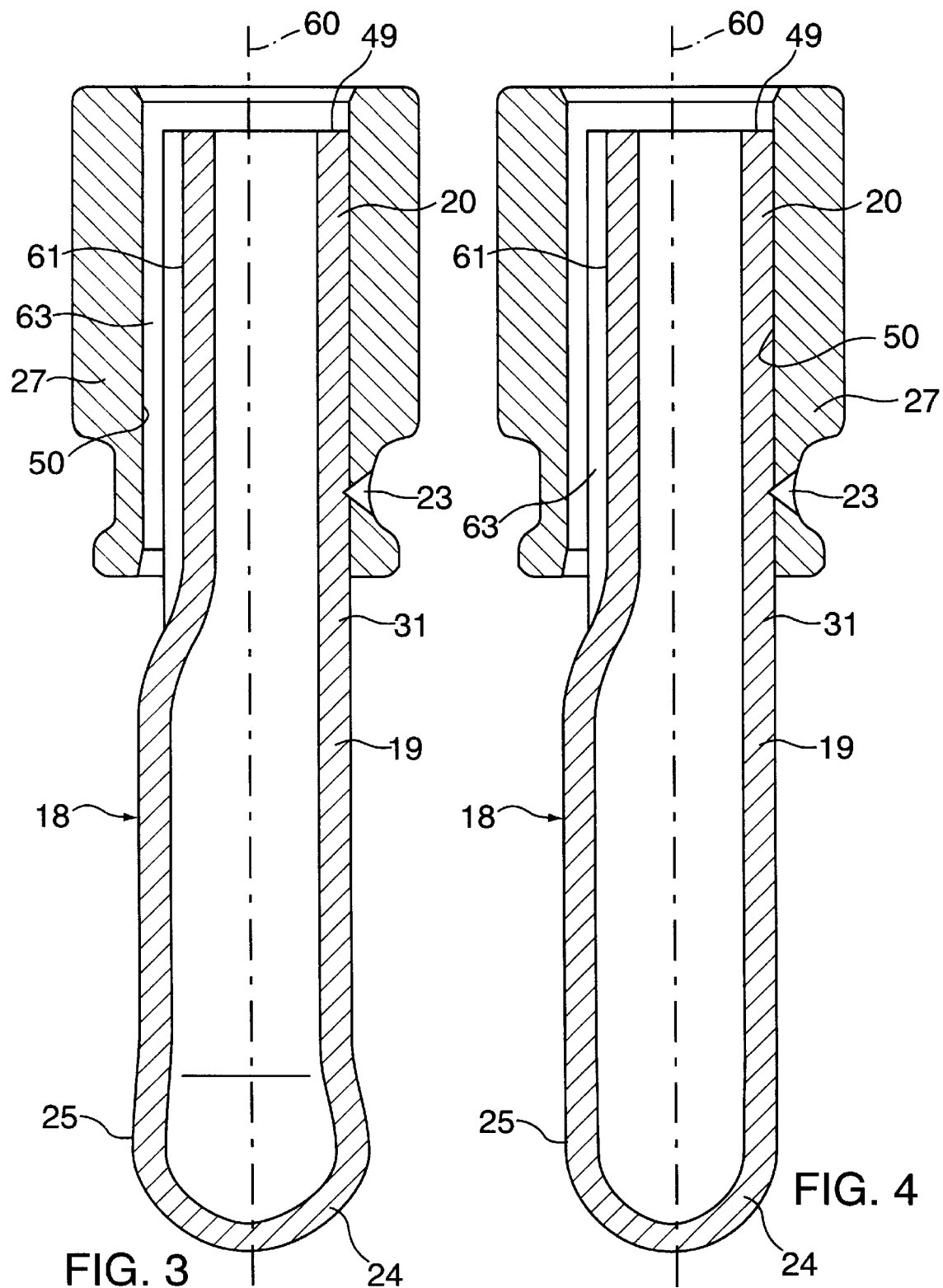

VALVE NEEDLE FOR AN ELECTROMAGNETICALLY ACTUATED VALVE AND PROCESS FOR MANUFACTURING THE SAME

FIELD OF THE INVENTION

The present invention is directed to a valve needle for an electromagnetically actuated valve or to a process for manufacturing a valve needle.

BACKGROUND OF THE INVENTION

The German Patent Application No. 40 08675 already discloses a valve needle for an electromagnetically actuated valve, which is comprised of an armature, a valve-closure member, and a tubular connecting part joining the armature and the, e.g., spherical valve-closure member. The enumerated parts represent individual parts, which are each manufactured separately and are first joined together by means of jointing methods, e.g. laser welding. Thus, there are at least two joints (Points of connection). The armature in this case completely embraces the connecting part radially and axially at least in part, since the connecting part is secured in a longitudinal orifice passing right through the armature. The connecting part, itself, also has a continuously traversing inner longitudinal orifice, in which the fuel can flow toward the valve-closure member and then flow out near the valve-closure member through radially running, crosswise orifices introduced in the inner wall of the connecting part. Therefore, the fuel first flows inside the valve needle and does not leave the valve needle until close to the valve seat.

It has also been disclosed by German Patent No. 42 30 376 to manufacture a valve needle for an electromagnetically actuated valve from a one-piece, tubular actuating part comprised of an armature section and a valve sleeve section by means of injection molding and subsequent sintering in accordance with the metal-injection-molding method (MIM). The actuating part is subsequently joined by a welding connection to a valve-closure member section. Provided in the armature section and the valve-sleeve section is a traversing, inner longitudinal opening, in which fuel can flow toward the valve-closure member section and then emerge out of the valve-sleeve section near the valve-closure member section through crosswise orifices. Thus, in manufacturing the valve needle using the so-called MIM method, slide molds are necessary to form the crosswise orifices.

SUMMARY OF THE INVENTION

In contrast, the advantage of the valve needle and process according to the present invention is that they make it possible to manufacture such a valve needle simply and cost-effectively. This is achieved in accordance with the present invention in that the connecting part is formed as a valve-needle section, in one piece with the valve-closure member section, using a deep-drawing method, so that the tool used to manufacture the deep-drawn part comprised of the valve-needle section and the valve-closure member section can be very simple in design. Transverse slide molds for producing crosswise orifices in the valve-needle section are not needed, since the fuel flows outside of the valve-needle section.

What is also advantageous during the deep-drawing process is that a comparatively simple flat blank of a suitable deep-drawing sheet metal can be used as starting material.

The deep-drawn part is inserted in an inner through-hole of an armature and permanently joined to the armature, e.g., by means of welded seams. Thus, the valve needle according to the present invention merely has a two-part design.

For example, two axially running flow channels inside the armature ensure an unhindered flow of fuel in the direction of the valve seat. The fuel emerging from the flow channels can flow along the periphery of the valve-needle section without being diverted.

What is advantageous is that beads provided in the valve-needle section, which are used to form the flow channels inside the armature, are able to be produced free of burrs, so that contrary to crosswise orifices afflicted with burrs in manufacturing processes known heretofore, no reworking is necessary. Moreover, it is especially advantageous that particles carried along in the fuel or washed-in dirt can settle in the cup-shaped deep-drawn part, so that leakage caused by blockage on the valve seat can be avoided.

BRIEF DESCRIPTION OF THE DRAWINGS

FIG. 3 illustrates a first sectional view of the valve needle according to the present invention, along the line III—III of FIG. 2.

FIG. 4 illustrates a second sectional view of the valve needle according to the present invention, along the line IV—IV of FIG. 2.

DETAILED DESCRIPTION OF THE INVENTION

Figure 1:
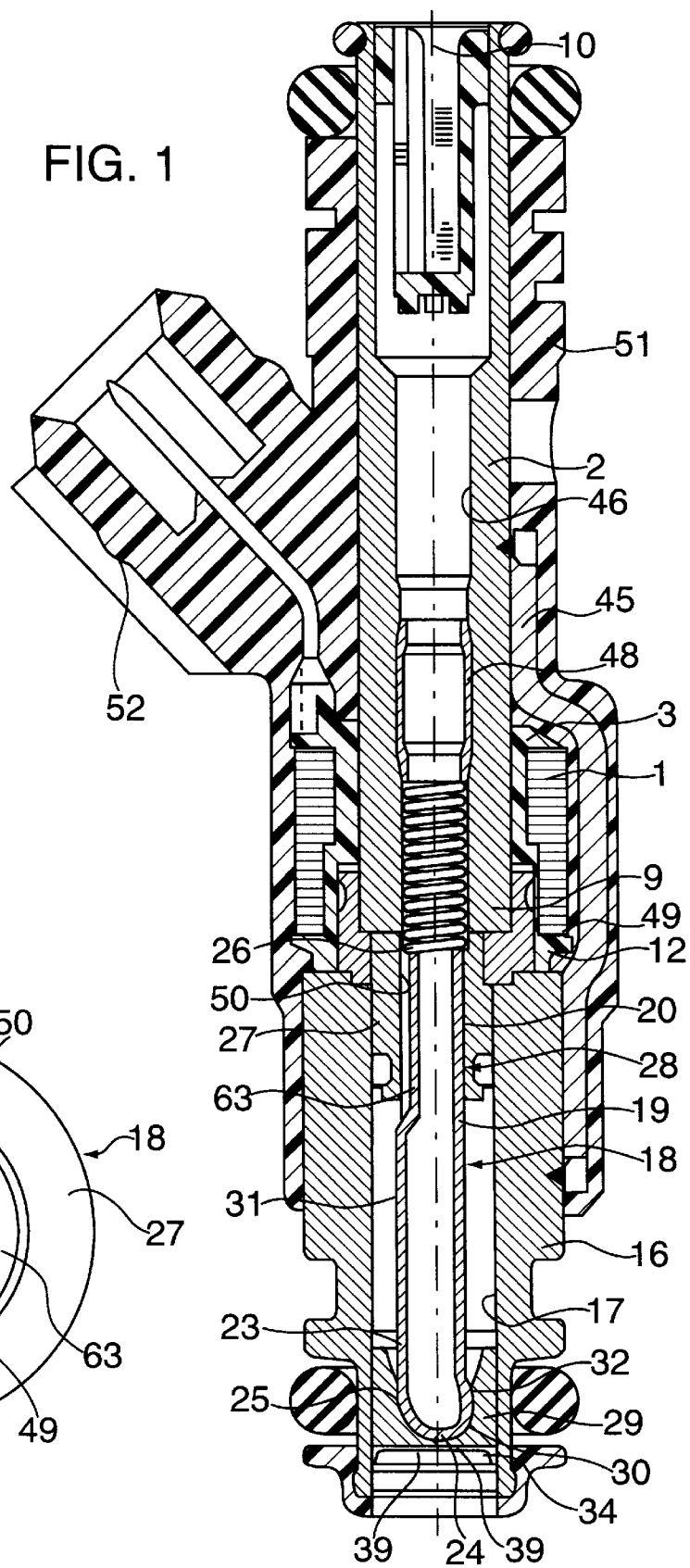
FIG. 1 illustrates a fuel-injection valve having a needle according to an embodiment of the present invention.

The electromagnetically actuated valve depicted by way of example in FIG. 1 in the form of an injection valve for fuel-injection systems of mixture-compressing internal combustion engines with externally supplied ignition has a tubular core 2, which has, for example, a constant outer diameter over its entire length, is surrounded by a solenoid coil 1, and is used as a fuel intake connection. A coil form 3 that is stepped in the radial direction accommodates a winding of the solenoid coil 1 and, in conjunction with the core 2, renders possible a compact design of the injection valve in the area of the solenoid coil 1.

Concentrically to a longitudinal valve axis 10, a tubular, metallic adapter part 12 is imperviously joined, for example by means of welding, to a lower core end 9 of the core 2 and axially surrounds the core end 9 in part. A tubular valveseat support 16, which, for example, is fixed to the adapter part 12, extends downstream from the coil form 3 and the adapter part 12. A longitudinal bore 17, which is formed concentrically to the longitudinal valve axis 10, runs in the valve-seat support 16.

A valve needle 18 in according to the present invention having a deep-drawn, tubular valve-needle section 19 is arranged in the longitudinal bore 17. Provided at the downstream end 23 of the valve-needle section 19 is a valve-closure member section 24, which has at least a partially spherical outer contour, is designed in one piece with the valve-needle section 19, and has five truncations (flattend area) 25 provided on its periphery, for example, to allow the fuel to flow past.

The injection valve is actuated electromagnetically in a generally known way. The electromagnetic circuit comprising the solenoid coil 1, the core 2, and an armature 27 is used to axially move the valve needle 18 and, thus, to open the injection valve opposite the spring tension of a restoring spring 26, or to close the injection valve. The tubular armature 27 is permanently attached, for example, by two welded seams 28 to an end 20 of the valve-needle section 19 inserted in the armature 27 and facing away from the valve-closure member section 24, and is aligned to the core 2. Together with the deep-drawn part 31 comprised of the valve-needle section 19 and the valve-closure member section 24 formed downstream, the armature 27 forms the valve needle 18 serving as the actuating part. A cylindrical valve-seat member 29, which has a fixed valve seat 30, is imperviously installed by means of welding in the downstream end of the valve-seat support 16 facing the core 2, in the longitudinal bore 17. A guide orifice 32 of the valve-seat member 29 is used to guide the valve-closure member section 24 during the axial movement of the valve needle 18 along the longitudinal valve axis 10. The valve-closure member section 24 of the valve needle 18 having a spherical outer contour interacts with the valve seat 30 of the valve-seat member 29 that tapers frustoconically in the direction of flow. At its front end facing away from the valve-closure member section 24, the valve-seat member 29 is permanently and imperviously joined by, e.g., a laser-produced welded seam to an apertured spray disk 34 having a pot shape, for example. At least one, for example four spray-discharge orifices 39 are provided in the apertured spray disk 34 by means of erosion or punching.

The insertion depth of the valve-seat member 29 with the apertured spray disk 34 determines the magnitude of the lift of the valve needle 18. The end position of the valve needle 18, given an unexcited solenoid coil 1, is stipulated by the contact making of the valve-closure member section 24 on the valve seat 30 of the valve-closure member 29, while the other end position of the valve needle 18, given an excited solenoid coil 1, results from the contact making (seating) of the armature 27 at the core end 9.

The solenoid coil 1 is surrounded by at least one conductive element 45, designed, for example, as a clip (bracket) and used as a ferromagnetic element, which surrounds the solenoid coil 1 in the circumferential direction at least partially and abuts with its one end on the core 2 and with its other end on the valve-seat support 16 and is able to be joined to said valve-seat support 16, for example, by means of welding, soldering, or bonding. An adjustment sleeve 48 inserted into a flow bore 46 of the core 2 running concentrically to the longitudinal valve axis 10 is used to adjust the initial spring tensioning of the restoring spring 26, which adjoins the adjustment sleeve 48 and is braced, in turn, with its opposite side, against an upstream front end 49 of the valve-needle section 19 in an inner through-hole 50 of the tubular armature 27.

The injection valve is largely enclosed by a plastic extrusion coat 51, which, emanating from the core 2, extends in the axial direction via the solenoid coil 1 and the at least one conductive element 45 up to the valve-seat support 16, the at least one conductive element 45 being completely covered axially and in the circumferential direction. Also belonging to this plastic extrusion coat 51 is, for example, an electrical plug connector 52 that is extruded on as well.

Figure 2:
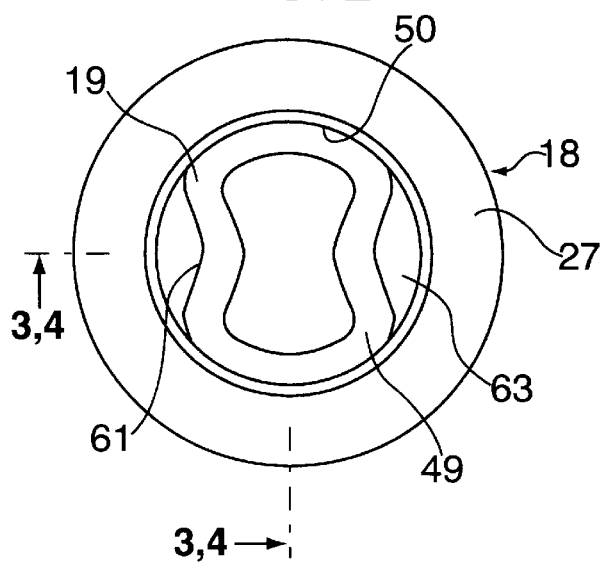
FIG. 2 illustrates a plan view of a valve needle according to the present invention.

A valve needle 18, according to the exemplary embodiment depicted in FIG. 1 is also illustrated in a plan view in FIG. 2. FIGS. 3 and 4 are sectional views along the line III—III or IV—IV in FIG. 2 and illustrate two exemplary embodiments of valve needles 18, which differ from one another only in the area of the valve-closure member sections 24. On the basis of these three FIGS., the design of the valve needle 18 or the process for its manufacture according to the present invention shall be elucidated in the following.

In a first process step, a flat blank made of a suitable deep-drawn sheet metal, e.g. of austenitic or ferritic steel, is formed into a cup-shaped part. This is a deep-drawing process, a translational tension-compression shaping (form design) process. The deep-drawing process is especially suited, as in the present case, for cold-forming hollow parts that are open to one side, rotationally symmetric, and have a constant wall thickness. In accordance with the design of the deep-drawing tool (bottom die, stamp), the cup-shaped deep-drawn part 31 comprised of the valve-needle section 19 and the valve-closure member section 24 can already be given a very exact form and size. The deep-drawn part 31 shown in FIG. 4 is able to be produced more simply than the deep-drawn part 31 shown in FIG. 3 using the deep-drawing process, since it has a constant inside diameter up to a valve-closure member section 24 having, e.g., a hemispherical bowl shape. On the other hand, the deep-drawing of the deep-drawn part 31 shown in FIG. 3 causes the inside diameter of the valve-needle section 19 and, thus, also the outside diameter as well to be enlarged in the vicinity of the valve-closure member section 24, so that, spatially, the outside contour of the valve-closure member section 24 has more than one hemisphere.

Provided in a following process step on the deep-drawn part 31 in the vicinity of the valve-closure member section 24 on its outer contour are, for example, five truncations 25, which are disposed equidistantly from one another and facilitate the flowing past of fuel in the guide orifice 32 of the valve-seat member 29 up to the valve seat 30. These truncations 25 extend at least up to the largest cross-section of the valve-closure member section 24, allowing a fuel flow to initially materialize, and do not reach up to the plane of contact (tangency) of the valve-closure member section 24 on the valve seat 30. These truncations 25 are premolded, e.g., by means of upsetting (heading) or stamping. These processes are translational compression shaping processes, in which, therefore, the tool essentially moves linearly. In terms of one particular case, substantially radially acting stamping forces cause a slight displacement of material toward a deep-drawing partial longitudinal axis 60, which, in the installed state of the valve needle 18, coincides with the longitudinal valve axis 10.

The valve-needle section 19 is subsequently provided at its end 20, which faces away from the valve-closure member section 24 and is secured later in the inner through-hole 50 of the armature 27, with, for example, two axially running V-shaped beads 61. These beads 61 are also premolded, e.g., by means of stamping so as to be free of burrs and, in fact, at least at such a length, that they project downstream out of the later installed armature 27. In the installed state of the deep-drawn part 31 in the armature 27, the beads 61 represent the flow channels 63, which are delimited by the inner wall of the armature 27 and by the contour of the beads 61 of the valve-needle section 19. Thus, coming from the flow bore 46 in the core 2, the fuel arrives at the armature 27 and enters into its inner through-hole 50 up to the front end 49 of the valve-needle section 19. On the one hand, fuel flows, at least in the case of immediate initial operation, into the inside of the cup-shaped deep-drawn part 31 and, mainly into both flow channels 63, which begin at the front end 49 and through which the fuel is now directed. In the vicinity of the end of the armature 27 facing the valve-closure member section 24, the fuel flows out of the flow channels 63 again and flows at least partially as a wall film of the deep-drawn part 31 to the valve seat 30. Thus, the fuel flow up to the valve seat 30 is completely guaranteed without longitudinal slits or crosswise orifices in the valve-needle section 19. The two last described process steps can also be carried out perfectly well in reverse chronological sequence, thus first premolding beads 61 and then applying the truncations 25, or be carried out simultaneously.

The valve-closure member section 24 undergoes a surface treatment in a next process step. This surface treatment can be realized as a hard-material coating with a thin, wear-resistant hard chromium layer. Other ideal coating materials are, for example, titanium carbide, titanium nitride or tungsten carbide. To apply the coating through the fine deposition of hard materials out of the gas phase, vapor-deposition processes, such as the so-called CVD (chemical vapor deposition)—or PVD (physical vapor deposition) processes have succeeded. A corresponding fine machining (e.g., lapping) of the valve-closure member section 24 having a partially spherical outer contour must then still follow when the surface quality does not yet have the quality stipulated for a valve-closure member.

A last process step for manufacturing the valve needle 18 follows. The deep-drawn part 31 is inserted into the inner through-hole 50 of the armature 27 and permanently fixed to the same. The permanent connection is able to be achieved, e.g., by applying two laser-produced welded seams 28 from the outer periphery of the armature 27. It is advantageous that the welded seams 28 oppose one another exactly and are only provided where the deep-drawn part 31 also contacts the inner wall of the armature 27, thus outside of the beads 61. The process according to the present invention for manufacturing a valve needle 18 has the advantage that the valve needle 18 is able to be fabricated without any cutting or burr-producing process steps.

All process steps described here that are required after the deep-drawing process do not necessarily have to be carried out in the specified chronological sequence. It is equally possible for the individual process steps to take place, at least in part, in a different chronological sequence or simultaneously.

What is claimed is:

1. A valve needle for an electromagnetically actuated valve, the actuated valve having a core, a solenoid coil and a fixed valve seat, the valve needle comprising:
   an armature;
   a valve closure member section interacting with the fixed valve seat;
   a valve needle section connecting the armature to the valve closure member section;
   wherein the valve needle section and the valve closure member section are formed from a single blank, the single blank being formed via deep-drawing, and the valve needle section and the valve closure member section forming a single element, wherein the single element has first and second ends, the first end being open and the second end being closed, and the valve closure member section is formed at the second end.

2. The valve needle as recited in claim 1, wherein the electromagnetically actuated valve includes an injection valve for a fuel-injection system of an internal combustion engine.

3. The valve needle as recited in claim 1, wherein the single element has an elongated cup shape, and the valve needle section has a tubular shape.

4. The valve needle as recited in claim 1, wherein the valve closure member section has a hemispherical-bowl shape.

5. The valve needle as recited in claim 3, wherein the first end is attached to the armature by at least one welded seam.

6. A valve needle for an electromagnetically actuated valve, the actuated valve having a core, a solenoid coil and a fixed valve seat, the valve needle comprising:
   an armature;
   a valve closure member section interacting with the fixed valve seat;
   a valve needle section connecting the armature to the valve closure member section, the valve needle section and the valve closure member section being formed from a single blank, the single blank being formed via deep-drawing; and
   at least one bead molded from an outer periphery of the valve needle section at a first end of the valve needle section, the first end facing away from the valve closure member section.

7. The valve needle as recited in claim 6, wherein at least one bead of the valve needle section has a V-shape and is elongated in an axial direction.

8. The valve needle as recited in claim 7, wherein the armature includes a through-hole for receiving the single element.

9. The valve needle as recited in claim 8, wherein when the single element is inserted in the through-hole and the at least one bead forms at least one axially running flow channel, the at least one flow channel being formed inside the armature.

10. A process for manufacturing a valve needle having an armature, the process comprising the steps of:
    shaping a single lank via a deep-drawing procedure to form a single element with a valve needle section and a valve closure member section, the valve closure member section having an outer periphery and the valve needle section having a first end facing away from the valve closure member section;
    placing at least one truncation on the outer periphery of the valve closure member section via at least one of an upsetting procedure and a stamping procedure;
    molding at least one bead at the first end of the valve needle section;
    surface-treating the valve closure member section; and
    connecting the armature and the valve needle section.

11. The process as recited in claim 10, wherein the at least one bead is molded via a stamping procedure.

12. The process as recited in claim 10, wherein the step of surface-treating includes applying at least one layer.

13. The process as recited in claim 12, wherein the at least one layer is applied by a chemical vapor deposition process.

14. The process as recited in claim 12, wherein the at least one layer is applied by a physical vapor deposition process.

15. The process as recited in claim 12, wherein the step of connecting includes forming a permanent attachment of the armature and the valve-needle section.

16. The process as recited in claim 10, wherein the valve closure member section and the valve needle section form a single element, the single element having an elongated cup shape and the valve needle section having a tubular shape.

17. The process as recited in claim 10, wherein the valve closure member section has a hemispherical-bowl shape.

18. The process as recited in claim 10, wherein the at least one bead of the valve needle section has a V-shape and is elongated in an axial direction.

19. The process as recited in claim 16, wherein the armature includes a through-hole for receiving the single element.

20. The process as recited in claim 19, wherein when the single element is inserted in the through-hole, the at least one bead forms at least one axially running flow channel, the at least one flow channel being formed inside the armature.

* * * * *